Patented July 21, 1953

2,646,440

UNITED STATES PATENT OFFICE 2,646,440

ORGANIC ARSENO POLYSULFIDES

Roland M. Kary, Metuchen, N. J., assignor to American Smelting and Refining Company, New York, N. Y., a corporation of New Jersey No Drawing. Application November 20, 1951, Serial No. 257,427

21 Claims. (Cl. 260—444)

This invention relates to novel organic arseno compounds and their preparation.

The new compounds are organic arseno polysulphides in which two arsenic atoms are directly attached to each other and in which each of the arsenic atoms has directly attached thereto a sulphur atom and an organic radical. The new compounds have the following structural formula:

in which As represents arsenic, S represents sulphur, and R and $R_1$ are organic substituents selected from the group consisting of neutral and acidic univalent saturated aliphatic radicals with the free valence belonging to a carbon atom having at least one hydrogen atom attached thereto, neutral and acidic univalent aromatic radicals with the free valence belonging to a benzene ring structure, and neutral and acidic univalent aromatic radicals with the free valence belonging to a carbon atom outside the ring structure which carbon atom has at least one hydrogen atom attached thereto.

The novel compounds are prepared by reducing the corresponding organic arsonic acids or their salts and reacting the reduced compounds with a sulfurizing agent in an acid medium. It has been found that the instant novel compounds are not formed unless the reaction with the sulfurizing agent is conducted in an acid medium. While it is not desired that the invention be limited by or to any particular theory or theories, it is believed that the probable reactions which are involved in the process are illustrated in the following equations:

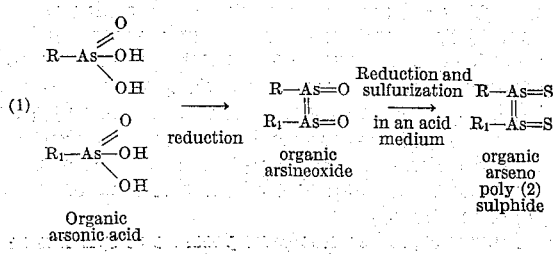

and/or

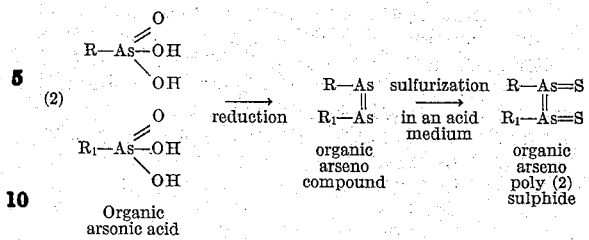

The starting compound or compounds may first be dispersed in a liquid, preferably an aqueous liquid, by forming a solution or suspension thereof or both in the liquid. A salt of an appropriate arsonic acid, especially a soluble salt such as a sodium or potassium salt, is a preferred starting material. Any reducing agent may be used to reduce the organic arsonic acids or their salts. The reduction may or may not be carried out in an acid medium depending upon the particular reducing agent used. Sulfurization of the reduced arsonic acids or salts is effectively accomplished in an acid medium with hydrogen sulphide or in the presence of hydrogen sulphide which may exist only momentarily in the acid medium. In establishing the acid medium for the sulfurization and for the reduction where the reduction is carried out in an acid medium, any acid may be used. However, enhanced results are obtained with acids such as acetic, hydrochloric and sulphuric acid with hydrochloric acid as the most preferred acid.

The reduction and sulfurization may be carried out simultaneously or the organic arsonic acids or their salts may first be reduced and then sulfurized. The reducing and sulfurizing agents may be added as such or they may be produced in situ. Amounts of the reagents above and below those theoretically required to accomplish the reduction and sulfurization may be used and the reactions may be carried out at temperatures up to about 80° C. and higher. For best results and the highest yields, however, theoretical amounts of the reducing and sulfurizing agents are used. With most reactants, temperatures below 80° C. and in the range 10–20° C. are used with about 16° C. as the preferred temperature for conducting the reaction or reactions.

One method of producing the novel compounds is the reduction of an appropriate organic arsonic acid or its salt with hypophosphorous acid in the presence of sulphur dioxide in an acid medium. The following equations, in which methyl arsonic acid is shown as the starting material, illustrate the probable mechanism of the reaction.

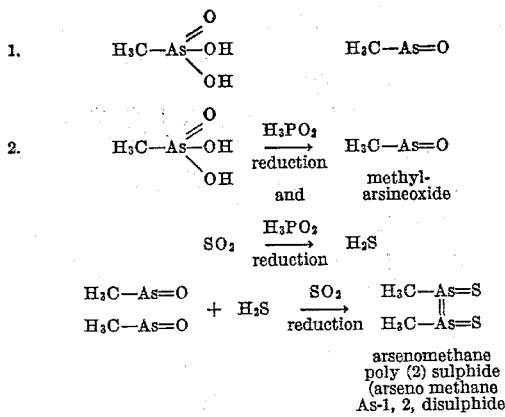

By maintaining the reaction temperatures below 80° C. yields of about 80-90% of theoretical may be obtained by this method. In practicing the method, it has been found that the presence of sulphur dioxide above or below the amount theoretically required tends to increase side reactions which reduce the yield. The use of sulphur dioxide in amounts substantially less than those theoretically required tends to form by-products which are very unstable compounds, some of which tend to be explosive.

Another method for producing the novel compounds is by the reduction of an appropriate organic arsonic acid or its salt with sodium formaldehyde sulfoxylate or other metal formaldehyde sulfoxylates, followed by sulfurization with hydrogen sulphide in an acid medium using hydrogen sulphide as such, or generated in situ in the acid medium from sodium sulphide or other alkali sulphides. The reduction with the sodium formaldehyde sulfoxylate may be carried out on the alkaline side but preferably it is conducted in a neutral solution at a temperature of about 80° C. For best results, the sulfurization is carried out at room temperatures and below; preferably at about 16° C. Good yields are also obtained with this method although they tend to be lower than those obtained by the use of hypophosphorous acid. The following equations illustrate the probable mechanism of the reactions involved:

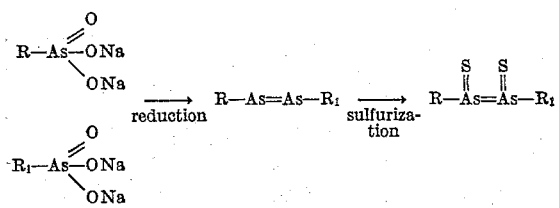

A further method for the preparation of the compounds is to reduce the organic arsonic acids or other salts with nascent hydrogen followed by sulfurization in an acid medium using hydrogen sulphide as such or generated in situ from sodium sulphide or other alkali metal sulphides. Any metal such as magnesium, zinc or iron scraps in an acid medium may be used to produce the nascent hydrogen. Fair yields are obtained with this method. It must, however, be practiced with caution because of the evolution of arsine gas which is liberated during the procedure. The probable mechanism of the reactions involved may be illustrated as follows:

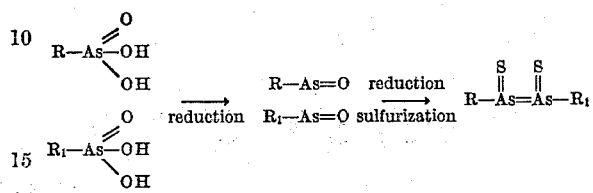

Another method for producing the compounds is to reduce a solution of the organic arsonic acids or their salts in an acid medium with sulphur dioxide as such or generated in situ followed by sulfurization in an acid medium with hydrogen sulphide using hydrogen sulphide gas or hydrogen sulphide generated in situ. To obtain highest yields with this method, it is desirable to remove any sulfurous acid formed in the solution before proceeding with the sulfurization step. The removal of the excess sulphur dioxide may be accomplished by adding barium carbonate to the solution. The probable mechanism of the reactions involved in this process are as indicated in the first and third of the preceding methods.

The preferred method for preparing the compounds is by the simultaneous reduction and sulfurization of an appropriate organic arsonic acid or salt thereof with sodium thiosulfate or other metal thiosulfate and sodium sulfite or other metal sulphites in an acid medium. The probable mechanism of the reaction is illustrated in the following equation in which the formation of arseno methane poly (2) sulfide is shown:

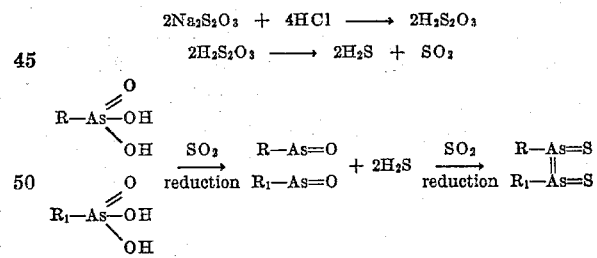

For best results and highest yields, amounts of the arsonic acid or its salt, the metal thiosulfate and metal sulphite in the molar ratio of 2-2-4 respectively are used and the process is carried out at room temperature and below, preferably at about 16° C.

It has not been possible, using the above methods to isolate aliphatic or aromatic arseno polysulphides having basic amino substituents on the organic radicals. It is believed that the difficulty in isolating these compounds is caused by the fact that they tend to form water soluble amine salts. In addition, unsaturated aliphatic arseno polysulphides, i. e. compounds which would contain carbon atoms connected to each other by a double bond, are synthesized with great difficulty, if at all, by the above methods. Thus, for example, arseno ethene poly (2) sulphide and arseno propene poly (2) sulphide could not be recovered by these methods.

Moreover, it has not been possible to synthesize aliphatic arseno compounds of the type having more than one carbon atom in the aliphatic substituent in which the alpha carbon atom has an oxygen atom attached thereto, as for example where the alpha carbon of such compounds constitutes a carbonyl group. Thus arseno acetyl poly (2) sulphide could not be made. On the other hand, compounds such as arseno acetone poly (2) sulphide (arseno acetone As-1,2, disulphide), and arseno isopropane poly (2) sulphide (arseno iso propane As-1,2 disulphide) are readily formed. Thus, in the novel arseno aliphatic polysulphides, the aliphatic substituents are univalent radicals with the free valence belonging to a carbon atom having at least one hydrogen atom attached thereto.

Likewise, it has not been possible to synthesize aromatic arseno polysulphides of the type in which the aromatic substituents are attached to the arsenic atoms through an aliphatic side chain in which the alpha carbon has attached thereto an oxygen atom. Thus arseno benzoyl poly (2) sulphide could not be made. Aromatic arseno polysulphides are formed however, when the aromatic groups are attached to the arsenic atoms through a univalent aliphatic side chain in which the free valence belongs to an alpha carbon atom having thereon at least one hydrogen atom.

In addition, organic arseno polysulphides could not be synthesized in which heterocyclic or alicyclic groups are directly attached to the arsenic atoms. Aromatic compounds, in which the aromatic substituent is a univalent aromatic radical with the free valence belonging to a benzene ring structure which may have condensed therewith heterocyclic groups are formed, however. Thus, for example, 7,7,-arseno-5-chloro-8-hydroxy-quinoline poly (2) sulphide is readily formed.

In all of the foregoing formulae and equations therefore, R and R₁ are organic substituents selected from the group consisting of neutral and acidic univalent saturated aliphatic radicals with the free valence belonging to a carbon atom having at least one hydrogen atom attached thereto, neutral and acidic univalent aromatic radicals with the free valence belonging to a benzene ring structure and neutral and acidic univalent aromatic radicals with the free valence belonging to a carbon atom outside the ring structure which carbon atom has at least one hydrogen atom attached thereto. The specified aliphatic and aromatic radicals may contain neutral and acidic groups; however, they are free of basic groups such as the NH₂ groups and other basic structures. The symbols R and R₁ are intended to include:

a. Alkyl radicals, such as methyl, ethyl, propyl (normal or branch chain) and similar radicals of the methane series.

b. Aralkyl radicals, such as phenyl methyl, phenyl ethyl, phenyl propyl (normal or branch chain), and similar alkyl radicals connected to the arsenic atoms and having an aryl group as a substituent in the alkyl chain.

c. Aryl radicals, such as phenyl, diphenyl, and naphthyl and other univalent aromatic hydrocarbon radicals whose free valence belongs to the nucleus and not to a side chain.

d. Alkaryl radicals, such as methyl phenyl, ethyl phenyl and other radicals in which the aryl group is directly attached to the arsenic atoms and is substituted with an alkyl group.

e. The specified aliphatic and aromatic radicals which are substituted alkyl, aralkyl, aryl and alkaryl radicals containing neutral and acid groups such as, for example, 2-arseno-ethanol-1-As-1,2 disulphide; 2-arseno-ethyl mercaptan 1-As-1,2 disulphide; 2 arseno-propionitrile-1-As-1,2 disulphide; arseno acetic acid As-1,2 disulphide; arseno acetone As-1,2 disulphide; p-hydroxy benzene As-1,2 disulphide; m-chloro benzene As-1,2 disulphide; p-hydroxy phenyl methane As-1,2 disulphide; m-chloro phenyl methane As-1,2 disulphide; 1-arseno-2-methyl-4-hydroxy-benzene As-1,2 disulphide.

f. The specified aromatic radicals in which a heterocyclic group is condensed with an aryl or substituted aryl group such as 7,7-arseno-5-chloro-8-hydroxy quinoline As-1,2 disulphide; 7,7-arseno-5-chloro-8-hydroxy quinaldine As-1,2 disulphide.

The compounds exhibit tautomerism and the existence of an arseno mercaptan tautomer in equilibrium with the corresponding organic poly (2) sulphide is indicated, especially by the fact that compounds such as arseno acetyl poly (2) sulphide could not be made while compounds such as arseno isopropane poly (2) sulphide and arseno acetone poly (2) sulphide are readily formed. Tautomeric compounds existing in equilibrium with the polysulphides are therefore also included in the scope of the invention and in the scope of the claims attached hereto.

The invention is further illustrated in the following specific examples. It should be understood, however, that these examples are given for purposes of illustration and that the invention in its broader aspects is not limited thereto.

Arseno methane poly (2) sulphide (arseno methane As-1,2 disulphide) was prepared by the following methods:

EXAMPLE I 124 cc. of concentrated sulphuric acid were added to 7.5 liters of water and the solution was cooled to room temperature. 1500 grams of disodium methylarsonate were slowly added to the aqueous acid solution while stirring. The final pH of the solution thus obtained was 7. 263 cc. of glacial acetic acid were slowly added with stirring, followed by the addition of 500 grams of anhydrous sodium sulphite. The temperature of the solution was then adjusted to 30° C., after which 2100 cc. of a 50% solution of hypophosphorous acid were slowly added with continuous stirring. The temperature of the solution was not allowed to exceed 75° C. during the exothermic reaction which took place upon the addition of the hypophosphorous acid. The resulting mixture was allowed to cool to room temperature after which the supernatant aqueous solution was decanted from the green-yellow pliable mass which had precipitated and accumulated on the bottom of the reaction vessel. This recovered green-yellow crude product was purified by dissolving in carbon disulphide, filtering and evaporating the carbon disulphide under reduced pressure to obtain a white crystalline solid product.

EXAMPLE II 50 grams of disodium methylarsonate were dissolved in 300 cc. of water. Hydrochloric acid was added to the solution in sufficient amount to adjust the pH to 7 after which 35.4 grams of sodium formaldehyde sulfoxylate were dissolved therein. The solution was then heated to 80° C. which temperature was maintained for 5-7 minutes and rapidly cooled to 16° C. 27 grams of sodium sulphide dissolved in 100 cc. of water were added to the cooled solution. The solution was acidified by adding thereto an excess of glacial acetic acid over a period of an hour while stirring and maintaining the solution temperature at 16° C. The stirring and cooling were continued until the precipitate which formed became voluminous. The stirring was then discontinued and the mixture was allowed to come to room temperature. After standing undisturbed for a period of one week, the crude product settled out of the mixture as a green-yellow pliable mass having a white top crust. At the end of this period, the supernatant solution was removed by decantation to recover the crude product which was then dried in vacuo.

EXAMPLE III 50 grams of disodium methyl arsonate were dissolved in 300 cc. of water and acidified to pH 5-6 with acetic acid. While continuously stirring the solution and maintaining the temperature at 16° C., 40 grams of magnesium metal scrap were slowly added in small portions alternating with acetic acid to maintain a pH of 5-6. After the addition of the metal scrap, 27 grams of sodium sulphide dissolved in 100 cc. of water were added to the solution with continued stirring while maintaining the solution at a temperature of about 16° C. and a pH of about 5-6. Upon standing, a green-yellow pliable mass separated from the solution accompanied by the evolution of arsine gas, $AsH_3$. The supernatant solution was removed by decantation and the recovered crude precipitate product was dried in vacuo.

EXAMPLE IV 50 grams of disodium methyl arsonate were dissolved in 1.2 liters of water and 20 cc. of concentrated hydrochloric acid were added to the solution to adjust its pH to a value of 4. 16.4 grams of sulphur dioxide gas were then passed into the solution through a porous plate gas dispenser while stirring the solution rapidly and maintaining its temperature at about 16° C. During the addition of the sulphur dioxide, the solution became yellow in color. After all the sulphur dioxide was passed through the porous plate, 60 grams of barium carbonate were added to precipitate any excess $SO_2$ and the solution was filtered. The pH of the filtered solution was adjusted to a value of about 4, and while maintaining its temperature at about 16° C., 5.85 grams of hydrogen sulphide were added through the porous plate dispenser while stirring the solution. The supernatant aqueous solution was decanted from the green-yellow pliable mass which accumulated on the bottom of the reaction vessel. The crude product thus recovered was dried in vacuo.

EXAMPLE V 58.4 grams of disodium methyl arsonate were dissolved in 1400 cc. of water after which 49.6 grams of sodium thiosulphate ($Na_2S_2O_3.5H_2O$) and 50.4 grams of anhydrous sodium sulphite were added and dissolved in succession. The solution was then cooled to 16° C. and while maintaining this temperature and with stirring, 138 cc. of a 37% solution of HCl were slowly added over a period of one hour. After the acid was added, the acid solution was allowed to stand undisturbed at room temperature for a period of one week, during which time a crude product settled out as a green-yellow pliable mass with a white crust on the top of the mass. The supernatant solution was removed by decantation and the recovered crude compound was dried in vacuo. A yield of arseno methane poly sulphide of 95.5% theoretical was obtained and the crude product had a purity of 84.4%.

In carrying out the above procedure, it was found that a decrease in the ratio of sodium thiosulphate and sodium sulphite to the arsonate resulted in a decrease in yield and in purity. The yield and the purity of the product increased as these ratios were increased until the ratio of 2-2-4 mols of disodium methyl arsonate, sodium thiosulphate and sodium sulphate, respectively, was reached.

Crude arseno methane poly (2) sulphide prepared in each of the Examples I-V was purified by dissolving in carbon disulphide, filtering off the insoluble impurities, followed by evaporating the carbon disulphide under reduced pressure to obtain a dry crystalline solid product. An analysis of the purified compound showed the following composition by weight:

|  | Percent |
|---|---|
| Carbon | 9.20 |
| Hydrogen | 2.37 |
| Arsenic | 61.14 |
| Sulphur | 25.70 |

These percentages by weight correspond to the total formula $C_{1n}H_{3n}As_{1n}S_{1n}$. The molecular weight was determined to be 242.0 which corresponds to a value of $n=2$. The final formula is, therefore, $C_2H_6As_2S_2$.

The purified arseno methane poly (2) sulphide was found to have the following physical properties:

(1) Melting point: 93° C.
(2) Boiling point: 250-260° C., decomposes.
(3) Vapor pressure:
    0.0006 mm. Hg at 27° C. (room temperature).
    0.0050 mm. Hg. at 50° C.
    0.0200 mm. Hg at 80° C.
(4) Volatility: 0.14% under atmospheric conditions during one week.

(5)     Specific gravity: $1.14 \frac{25.3° C.}{25.3° C.}$ (6) Solubility:
    Carbon disulphides—very soluble.
    Ethyl alcohol (abs.)—slightly soluble.
    Methyl alcohol (abs.)—slightly soluble.
    Ethel ether—somewhat soluble.
    Chloroform—somewhat soluble.
    Benzene—insoluble.
    Toluene—insoluble.
    Petroleum ether—insoluble.
    Naphtha—somewhat soluble.
    Cutting oil—somewhat miscible.
    Motor oil—miscible upon slight warming.

A comparison of several of the physical properties of methyl arseno poly (2) sulphide with various organic arsenic sulphur compounds is given in the following table:

| Compound | | M. P., °C. | Solubility |
|---|---|---|---|
| Name | Formula | | |
| Methylarsine sulphide | $H_3C-As=S$ | 110 | |
| Dimethylarsine sulphide | 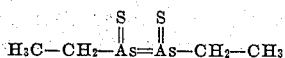 | oil, B. P.=211° C | miscible with alcohol, ether. |
| Methylarsine disulphide | $H_3C-As\underset{S}{\overset{S}{\lessgtr}}$ | semi-solid mass | carbon disulphide soluble also in ether, alcohol, chloroform. |
| Trimethyl arsinesulphide | $\begin{array}{c}H_3C\\H_3C-As=S\\H_3C\end{array}$ | 168 | soluble in $CS_2$, alcohol, chloroform. |
| Dimethylarsine disulphide | 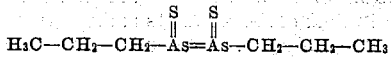 | 60 | readily soluble in alcohol, sparingly in ether. |
| Arsenomethane poly (2) sulphide. | $CH_3-\overset{S}{\overset{\|}{As}}=\overset{S}{\overset{\|}{As}}-CH_3$ | 93° C | carbon disulphide: very soluble alcohol, ether: less soluble water: insoluble. |

EXAMPLE VI

*Arsenoethane poly-2-sulphide (arseno ethane As-1,2 disulphide)*

$$H_3C-CH_2-\overset{S}{\overset{\|}{As}}=\overset{S}{\overset{\|}{As}}-CH_2-CH_3$$

9.7 grams of sodium hydroxide were dissolved in 54 cc. of water and 8 grams of arsenic trioxide were then dissolved in the solution with stirring. 12.6 grams of ethyl iodide were added to the solution and the mixture was heated to 60° C. and maintained at this temperature with stirring for 35–45 minutes. During this period, the two separate layers of the mixture disappeared and the solution became red-brown in color.

Arsenoethane poly-2-sulphide was prepared from the above-prepared ethyl arsonate solution according to the method of Example V. The ethyl arsonate solution was diluted with water to 740 cc. To the diluted solution was added 20.1 grams of sodium thiosulphate and 20.4 grams of anhydrous sodium sulphite. After these additions, the solution was cooled to 16° C. and while stirring, 55.5 cc. of a 37% aqueous HCl solution was slowly added over a period of one hour while maintaining the temperature at 16° C. The solution was then allowed to stand undisturbed for a period of one week. At the end of this time the supernatant liquor was decanted from the yellow-green precipitate on the bottom of the reaction vessel and the thus recovered crude product was dried under vacuum. An arsenoethane poly (2) sulphide product yield amounting to 64% of the theoretical was obtained.

EXAMPLE VII

*Arseno n-propane poly-2-sulphide (arseno n-propane As-1,2 disulphide)*

$$H_3C-CH_2-CH_2-\overset{S}{\overset{\|}{As}}=\overset{S}{\overset{\|}{As}}-CH_2-CH_2-CH_3$$

Disodium n-propyl arsonate was prepared according to the procedure described for the preparation of disodium ethyl arsonate in Example VI, using 19.4 grams of sodium hydroxide, 16 grams of arsenic trioxide, 27.4 grams of n-propyl iodide and 64 cc. of water.

Arseno n-propane poly (2) sulphide was prepared from the n-propyl arsonate using the procedure described in Example V. The n-propyl arsonate solution was diluted with water to 1880 cc. To the diluted solution was added 40.2 grams of sodium thiosulphate and 40.8 grams of anhydrous sodium sulphate. While maintaining at a temperature of 16° C. in the solution, 110 cc. of the 37% of the solution of HCl were slowly added over a period of one hour. After standing undisturbed for one week, the supernatant liquor was decanted and the crude green-yellow powderous precipitated product that collected on the bottom of the reaction vessel was recovered and dried under vacuum.

EXAMPLE VIII

*Arseno iso-propane poly-2-sulphide (arseno iso-propane As-1,2 disulphide)*

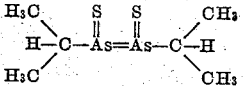

Disodium iso-propyl arsonate was prepared in the manner described in the preparation of disodium n-propyl arsonate in Example VII using 19.4 grams of sodium hydroxide, 16 grams of arsenic trioxide, 27.4 grams of iso-propyl iodide and 64 cc. of water. Arseno iso-propane poly (2) sulphide was prepared from the disodium iso-propyl arsonate solution also using the procedure and the amounts of sodium thiosulphate, anhydrous sodium sulphite and hydrochloric acid set forth in Example VII to obtain a crude greenish-yellow product.

EXAMPLE IX

*Arseno-ethane-methane poly-2-sulphide (arseno ethane, methane As-1,2 disulphide)*

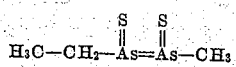

Disodium ethyl arsonate was prepared as described in Example VI using 12 grams sodium hydroxide, 50 cc. of water, 9.9 grams of arsenic trioxide, and 15.6 grams of ethyl chloride. 29.2 grams of disodium methylarsonate were then added to the solution of disodium ethyl arsonate and the total solution was diluted to 900 cc. using water. Arseno-ethane-methane poly-2-sulphide was then prepared from the solution containing the disodium methyl and disodium ethyl arsonate using the procedure and the amounts of sodium thiosulphate, anhydrous sodium sulphite and hydrochloric acid set forth in Example VII. At the end of the seven day standing period, the crude product was recovered by decantation and vacuum drying. A product yield of 60% of theoretical was obtained.

EXAMPLE X

*Arseno phenylmethane poly (2) sulphide (arseno phenylmethane As-1,2 disulphide)*

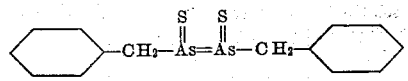

4 grams of benzyl arsonic acid was dissolved in 10 cc. of water containing 1.6 grams of sodium hydroxide. The solution of the sodium salt of the benzyl arsonic acid thus formed was treated in accordance with the procedure described in Example V. It was diluted to 140 cc. with water. 4.4 grams sodium thiosulphate, 4.5 grams of anhydrous sodium sulphite and 12.3 cc. of a 37% aqueous solution of HCl were added to the diluted solution while maintaining its temperature at about 16° C. The precipitation of the arseno phenylmethane poly-2-sulphide which began during the addition of the acid proceeded to completion during the one week period in which the solution was allowed to stand undisturbed at room temperatures. At the end of this period a crude product amounting to a yield of 85.7% of the theoretical was obtained by decanting the supernatant liquid and drying the recovered precipitate under vacuum.

EXAMPLE XI

*Arseno benzene poly (2) sulphide (arseno benzene As-1,2 disulphide)*

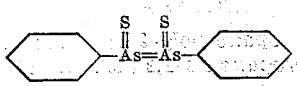

40.4 grams of phenylarsonic acid were dissolved in 20.2 cc. of aqueous sodium hydroxide solution containing 8.1 grams of NaOH. Upon diluting the resultant solution to 1400 cc. with water, the procedure outlined in Example V was carried out, using the amounts of sodium thiosulphate, anhydrous sodium sulphite and hydrochloric acid set forth therein. After standing for a period of one week the product obtained by decanting the supernatant liquid and drying the recovered precipitate under vacuum amounted to a yield of 92.3% of the theoretical.

EXAMPLE XII

*Arseno p-hydroxybenzene poly-2-sulphide (arseno p-hydroxybenzene As-1,2 disulphide)*

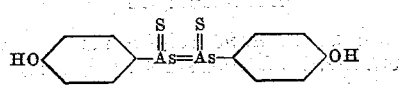

57 grams of sodium p-hydroxy phenylarsonate were dissolved in 200 cc. of water. The arsonate solution was then diluted to 1400 cc. with water and the procedure outlined in Example V was carried out using the amounts of sodium thiosulphate, anhydrous sodium sulphite and hydrochloric acid set forth therein. The arseno p-hydroxybenzene poly (2) sulphide recovered after the resulting solution was allowed to stand at room temperature for the period of one week, amounted to a yield of 82.5% of the theoretical.

EXAMPLE XIII

*7,7 arseno-5-chloro-hydroxyquinoline poly (2) sulphide (7,7 arseno-5-chloro-8-hydroxyquinoline As-1,2 disulphide)*

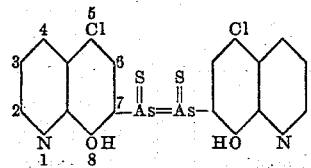

19.8 grams of arsenic trioxide were dissolved in 100 cc. of an aqueous solution of sodium hydroxide containing 24 grams of NaOH. This arsenite solution was diluted with 1400 cc. of water and to the solution was added 61.1 grams of 5-chloro-7-iodo-8-hydroxyquinoline. The resulting suspension was heated with stirring to 98° C. and kept at this temperature until most of the quinoline compound was dissolved and the solution had taken on a red-brown color. The solution containing some undissolved material was cooled to 16° C. after which 49.6 grams of sodium thiosulphate, 50.4 grams of anhydrous sodium sulphite and 138 cc. of a 37% aqueous solution of HCl was added in the manner described in Example V. The solution was allowed to stand undisturbed at room temperature for a period of one week, after which time a precipitate was recovered which amounted to a crude product yield of 39.4% of the theoretical.

EXAMPLE XIV

*Arseno o-methylbenzene poly (2) sulphide (arseno o-methylbenzene As-1,2 disulphide)*

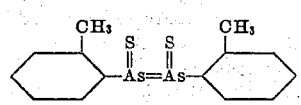

43.2 grams of o-methylphenylarsonic acid were dissolved in 20.2 cc. of aqueous sodium hydroxide solution containing 8.1 grams of NaOH. Upon diluting the resultant solution to 1400 cc. with water, the procedure described in Example V was carried out, using the amounts of sodium thiosulphate, anhydrous sodium sulphite and hydrochloric acid set forth therein. After standing for a period of one week the product was obtained by decanting the supernatant liquid and drying the recovered precipitate in vacuo.

EXAMPLE XV

*Arseno-3-chlorobenzene poly (2) sulphide (arseno 3-chlorobenzene As-1,2 disulphide)*

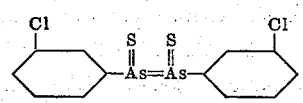

47.3 grams of 3-chlorophenylarsonic acid were dissolved in 20.2 cc. of aqueous sodium hydroxide solution containing 8.1 grams of NaOH. Upon diluting the resultant solution to 1.4 liters with water the procedure described in Example V was carried out, using the amounts of sodium thiosulphate, anhydrous sodium sulphite hydrochloric acid set forth therein. After standing for a period of one week, the crude product was recovered by decanting off the supernatant liquid and drying the recovered precipitate in vacuo.

EXAMPLE XVI

*Arseno acetone poly (2) sulphide (arseno acetone As-1,2 disulphide)*

$$CH_3-\overset{O}{\underset{\|}{C}}-CH_2-\overset{S}{\underset{\|}{As}}=\overset{S}{\underset{\|}{As}}-CH_2-\overset{O}{\underset{\|}{C}}-CH_3$$

Disodium acetone arsonate was prepared in accordance with the procedure described in Example VI in connection with the production of disodium n-propyl arsonate. 19.8 grams $As_2O_3$ were dissolved in 100 cc. water containing 24.0 grams NaOH in the usual manner to form sodium arsenite. This solution was diluted up to 400 cc. with water after which 18.5 grams monochloroacetone were added. After several hours stirring the solution took on a red color which deepened as stirring was continued. Stirring of the mixture at room temperature was maintained until no further change in color intensity indicated completion of the reaction.

The thus obtained arsonate solution was treated with amounts of sodium thiosulphate, sodium sulphite and 37% HCl as described in Example V. After standing for one week, the crude compound was recovered by decantation, followed by drying in vacuo.

The instant novel compounds exhibit insecticidal activity. Arseno methane polysulphide in particular has been found to be an excellent insecticide. Because of its high toxicity for insects, arseno methane polysulphide may be used effectively at such low concentrations as to greatly reduce or eliminate its toxic effect on animals and humans without impairing its effect on insects.

The insecticidal activity of arseno methane polysulphide as compared to other insecticides currently in use is indicated by the following tabulation of the results of tests on various insects.

Table II (1) CONFUSED FLOUR BEETLE

| Compound | Concentration; Percent of Compound in Flour | Closed Petri-Dish Test Percent Mortality during 5 days |
|---|---|---|
| Arseno methane poly (2) sulphide | 0.005 | 100 |
| DDT | 0.010 | 40 |
| Calcium arsenate | 2.000 | 50 |
| Parathion | 0.0005 | 100 |

(2) TERMITE

| Compound | Soil samples with wood in jars | |
|---|---|---|
| | Concentration, Percent | Effect |
| Arseno methane poly (2) sulphide | 0.05 | died out. |
| Acid lead arsenate | 0.05 | Do. |

(3) GRANARY WEEVIL

| | | |
|---|---|---|
| Arseno methane poly (2) sulphide | 1/1,000 per wt. grain, 1 to 1,000 in wheat. | no grain destroyed after 2½ months. |
| DDT | 1/1,000 per wt. grain, 5% std. in pyrophyllite and MgO. | Several months' protection. |

(4) MEXICAN BEAN BEETLE—3RD INSTAR LARVAE

| Compound | Concentration, Percent | Percent dead in 24 hours |
|---|---|---|
| a. Fumigation Effect: | | |
| Arseno methane poly (2) sulphide | 1.0 | 95 |
| Calcium Arsenate | 5.0 | 0 |
| Methoxychlor | 4.0 | 0 |
| DDT | 5.0 | 0 |
| Rotenone | 0.5 | 0 |
| b. Dusting on Test Plants: | | |
| Arseno methane poly (2) sulphide | 5.0 | 90 |
| | 2.0 | 40 |
| Calcium arsenate | 5.0 | 50 |
| Methoxychlor | 2.0 | 50 |

(5) CARPET BEETLE LARVAE

| Compound | Concentration, Percent | Percent Dead, Days | | | |
|---|---|---|---|---|---|
| | | 10 | 20 | 30 | 40 |
| Arseno methane poly (2) sulphide | 0.5 | 0 | 10 | 20 | 30 |
| DDT | 5.0 | 0 | 0 | 10 | 10 |
| Acid lead arsenate | 10.0 | 0 | 0 | 0 | 0 |
| Calcium arsenate | 5.0 | 0 | 0 | 0 | 0 |
| Methoxychlor | 5.0 | 0 | 0 | 10 | 10 |

While the character of the invention has been described in detail and numerous examples have been given, this has been done by way of illustration only and with the intention that no limitation on the invention be imposed thereby. Numerous modifications and variations of the illustrative examples may be effected by those skilled in the art in practicing the invention which is of the scope of the claims appended hereto.

What is claimed is:

1. Compounds of the formula $$R-\overset{S}{\underset{\|}{As}}=\overset{S}{\underset{\|}{As}}-R_1$$

in which As represents arsenic, S represents sulphur and R and $R_1$ are organic substituents selected from the group consisting of neutral and acidic univalent saturated aliphatic radicals with the free valence belonging to a carbon atom having at least one hydrogen atom attached thereto, neutral and acidic univalent aromatic radicals with the free valence belonging to a benzene ring, and neutral and acidic univalent aromatic radicals with the free valence belonging to a carbon atom outside the ring structure and which carbon has at least one hydrogen atom attached thereto.

2. Compounds of the formula $$R-\overset{S}{\underset{\|}{As}}=\overset{S}{\underset{\|}{As}}-R_1$$

in which As represents arsenic, S represents sulphur and R and $R_1$ are alkyl radicals.

3. Compounds of the formula $$R-\overset{S}{\underset{\|}{As}}=\overset{S}{\underset{\|}{As}}-R_1$$

in which As represents arsenic, S represents sulphur and R and $R_1$ are aralkyl radicals.

4. Compounds of the formula $$R-\overset{S}{\underset{\|}{As}}=\overset{S}{\underset{\|}{As}}-R_1$$

in which As represents arsenic, S represents sulphur and R and $R_1$ are aryl radicals.

5. Compounds of the formula

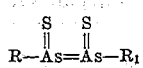

in which As represents arsenic, S represents sulphur and R and R₁ are alkaryl radicals.

6. Arseno methane As-1,2 disulphide.
7. Arseno acetone As-1,2 disulphide.
8. Arseno phenylmethane As-1,2 disulphide.
9. Arseno benzene As-1,2 disulphide.
10. Arseno o-methylbenzene As-1,2 disulphide.
11. A method for the production of organic arseno polysulphides which comprises dispersing in a liquid a compound of the formula

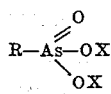

in which As represents arsenic, O represents oxygen and X is a member of the group consisting of hydrogen and a metal and R is an organic substituent selected from the group consisting of neutral and acidic univalent saturated aliphatic radicals with the free valence belonging to a carbon atom having at least one hydrogen atom attached thereto, neutral and acidic univalent aromatic radicals with the free valence belonging to a benzene ring, and neutral and acidic univalent aromatic radicals with the free valence belonging to a carbon atom outside the ring structure and which carbon has at least one hydrogen atom attached thereto, reducing said compound with a reducing agent and reacting the reduced compound with a sulfurizing agent other than said reducing agent in the presence of an acid.

12. A method according to claim 16 in which the reduction and sulfurization are carried out simultaneously.

13. A method according to claim 16 in which the sulfurizing agent is hydrogen sulphide.

14. A method according to claim 16 in which the sulfurizing agent is hydrogen sulphide generated in situ.

15. A method for the production of an organic arseno polysulphide by reducing a corresponding organic arsonic compound and reacting the reduced compound with a sulfurizing agent in an acid medium which comprises dispersing in a liquid a compound of the formula

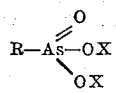

in which As represents arsenic, O represents oxygen and X is a member of the group consisting of hydrogen and a metal and R is an organic substituent selected from the group consisting of neutral and acidic univalent saturated aliphatic radicals with the free valence belonging to a carbon atom having at least one hydrogen atom attached thereto, neutral and acidic univalent aromatic radicals with the free valence belonging to a benzene ring, and neutral and acidic univalent aromatic radicals with the free valence belonging to a carbon atom outside the ring structure and which carbon has at least one hydrogen atom attached thereto, and reacting the dispersed compound in an acid medium with hypophosphorous acid in the presence of sulphur dioxide.

16. A method for the production of an organic arseno polysulphide by reducing a corresponding organic arsonic compound and reacting the reduced compound with a sulfurizing agent in an acid medium which comprises dispersing in a liquid a compound of the formula

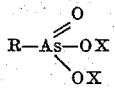

in which As represents arsenic, O represents oxygen and X is a member of the group consisting of hydrogen and a metal and R is an organic substituent selected from the group consisting of neutral and acidic univalent saturated aliphatic radicals with the free valence belonging to a carbon atom having at least one hydrogen atom attached thereto, neutral and acidic univalent aromatic radicals with the free valence belonging to a benzene ring, and neutral and acidic univalent aromatic radicals with the free valence belonging to a carbon atom outside the ring structure and which carbon has at least one hydrogen atom attached thereto, and reacting the dispersed compound in an acid medium with a metal thiosulphate and a metal sulphite.

17. A method according to claim 16 in which the metal thiosulphate is sodium thiosulphate, the metal sulphite is sodium sulphite, and hydrochloric acid is the acid in the acid medium.

18. A method according to claim 16 in which two mols of a metal thiosulphate and four mols of a metal sulphite are used for each two mols of the organic arsonic compound, and the reaction temperature is maintained in the range 10–20° C.

19. A method for the production of organic arseno polysulphides which comprises dispersing in a liquid a compound of the formula

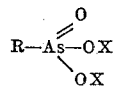

in which As represents arsenic, O represents oxygen and X is a member of the group consisting of hydrogen and a metal and R is an organic substituent selected from the group consisting of neutral and acidic univalent saturated aliphatic radicals with the free valence belonging to a carbon atom having at least one hydrogen atom attached thereto, neutral and acidic univalent aromatic radicals with the free valence belonging to a benzene ring, and neutral and acidic univalent aromatic radicals with the free valence belonging to a carbon atom outside the ring structure and which carbon has at least one hydrogen atom attached thereto, reducing said compound with sodium formaldehyde sulfoxylate and then reacting the reduced compound with hydrogen sulphide in an acid medium.

20. A method for the production of organic arseno polysulphides which comprises dispersing in a liquid a compound of the formula

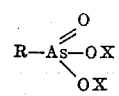

in which As represents arsenic, O represents oxygen and X is a member of the group consisting of hydrogen and a metal and R is an organic substituent selected from the group consisting of neutral and acidic univalent saturated aliphatic radicals with the free valence belonging to a carbon atom having at least one hydrogen atom attached thereto, neutral and acidic univalent aromatic radicals with the free valence belonging to a benzene ring, and neutral and acidic univalent aromatic radicals with the free valence belonging to a carbon atom outside the ring structure and which carbon has at least one hydrogen atom attached thereto, reducing said compound with nascent hydrogen by acidifying the dispersion and adding a metal thereto, and then reacting the reduced compound with hydrogen sulphide in an acid medium.

21. A method for the production of organic arseno polysulphides which comprises dispersing in a liquid a compound of the formula

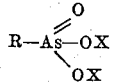

in which As represents arsenic, O represents oxygen and X is a member of the group consisting of hydrogen and a metal and R is an organic substituent selected from the group consisting of neutral and acidic univalent saturated aliphatic radicals with the free valence belonging to a carbon atom having at least one hydrogen atom attachced thereto, neutral and acidic univalent aromatic radicals with the free valence belonging to a benzene ring, and neutral and acidic univalent aromatic radicals with the free valence belonging to a carbon atom outside the ring structure and which carbon has at least one hydrogen atom attached thereto, reducing said compound with sulphur dioxide in an acid medium and then reacting the reduced compound with hydrogen sulphide in an acid medium.

ROLAND M. KARY.

References Cited in the file of this patent

Schulte, Ber., vol. 15 (1882), pages 1955–1960.
Betheim, Organische Aresenverbindunzen, page 133 (1913), Stuttgart.